(12) United States Patent
Banik et al.

(10) Patent No.: US 12,073,225 B2
(45) Date of Patent: Aug. 27, 2024

(54) TECHNOLOGY TO MEASURE BOOT ACTIVITY BEFORE A PROCESSOR ENTERS A WORKING STATE

(71) Applicant: Intel Corporation, Santa Clara, CA (US)

(72) Inventors: Subrata Banik, Bangalore (IN); Asad Azam, El Dorado Hills, CA (US); Vincent James Zimmer, Issaquah, WA (US); Rajaram Regupathy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 17/097,055

(22) Filed: Nov. 13, 2020

(65) Prior Publication Data
US 2022/0091853 A1 Mar. 24, 2022

(30) Foreign Application Priority Data
Sep. 23, 2020 (IN) .............................. 202041041131

(51) Int. Cl.
G06F 9/4401 (2018.01)
G06F 3/06 (2006.01)
G06F 13/16 (2006.01)

(52) U.S. Cl.
CPC .......... *G06F 9/4403* (2013.01); *G06F 3/0611* (2013.01); *G06F 3/0659* (2013.01); *G06F 3/068* (2013.01); *G06F 13/1668* (2013.01)

(58) Field of Classification Search
None
See application file for complete search history.

(56) References Cited

U.S. PATENT DOCUMENTS

| 6,052,793 | A  | 4/2000 | Mermelstein |
| 2006/0179308 | A1 | 8/2006 | Morgan et al. |
| 2009/0276617 | A1 | 11/2009 | Grell et al. |
| 2015/0100176 | A1 | 4/2015 | Shabbir et al. |
| 2018/0314832 | A1 | 11/2018 | Nunami et al. |

(Continued)

OTHER PUBLICATIONS

ISA/KR, International Search Report and Written Opinion mailed Dec. 3, 2021 in Appl. No. PCT/US2021/047429 (10 pages).

(Continued)

*Primary Examiner* — Paul Yen
(74) *Attorney, Agent, or Firm* — Trop Pruner & Hu, P.C.

(57) ABSTRACT

A data processing system comprises a processing core to execute a basic input/output system (BIOS) as part of a boot process. The data processing system also comprises static random-access memory (SRAM) in communication with the processing core. The data processing system also comprises a pre-BIOS component in communication with the SRAM. The pre-BIOS component is configured to execute a pre-BIOS block before the processing core begins executing the BIOS. The pre-BIOS block, when executed by the pre-BIOS component, causes the pre-BIOS component to (a) initialize the pre-BIOS component, (b) measure an amount of time taken to initialize the pre-BIOS component, and (c) save the measured amount of time to the SRAM as a pre-BIOS boot-time record. Other embodiments are described and claimed.

20 Claims, 4 Drawing Sheets

(56) References Cited

U.S. PATENT DOCUMENTS

2019/0050234 A1* 2/2019 Segal .................. G06F 1/12

OTHER PUBLICATIONS

Intel Corporation, "Intel® Firmware Support Package for Intel® Architecture," 2014, 6 pages total.
Jimin Sun, et al., Apress Media, LLC, "Embedded Firmware Solutions, Development Best Practices for the Internet of Things," 2015, 203 pages total.
Uefi Forum, Inc., "Advanced Configuration and Power Interface (ACPI) Specification," Version 6.3, Jan. 2019, pp. 1-7, 22, 28, 45, 67, 165, 173, and 262-268.

* cited by examiner

| PreBIOS Component Codes |
|---|
| 0x01 = Core1 |
| 0x02 = Core2 |
| ... |
| 0x08 = Core8 |
| 0x09 = ME |
| 0x0A = PMC |
| 0x0B = CMC |
| 0x0C = ACM |
| 0x0D-FF(reserved) |

FIG. 3

Shared SRAM 82

| Telemetry Area 86 | Meaning |
|---|---|
| 88 → | |
| 0x090927C0 | ME Boot Time = 600,000 μs |
| 0x0A0493E0 | PMC Boot Time = 300,000 μs |
| 0x0B061A80 | CMC Boot Time = 400,000 μs |
| 0x0103D090 | Core1 Boot Time = 250,000 μs |
| 0x0203D090 | Core2 Boot Time = 250,000 μs |
| 0xDEADBEEF | null |
| 0xDEADBEEF | null |
| ... | ... |

FIG. 4

TECHNOLOGY TO MEASURE BOOT ACTIVITY BEFORE A PROCESSOR ENTERS A WORKING STATE

CROSS-REFERENCE TO RELATED APPLICATIONS

This application claims the benefit of India provisional patent application number 202041041131, entitled "Technology To Measure Boot Activity Before A Processor Enters A Working State," which was filed in India with the Office of the Controller General of Patents, Designs and Trade Marks (the "Indian Patent Office") on Sep. 23, 2020.

TECHNICAL FIELD

The present disclosure pertains to data processing systems, and in particular to technology for measuring boot activity in a data processing system.

BACKGROUND

When a conventional data processing system is turned on, it completes a boot process before it begins performing useful work. For instance, the data processing system may need to launch an operating system (OS) before the data processing system can execute applications, and the data processing system may need to launch a basic input/output system (BIOS) before launching the OS. Furthermore, some components in the data processing system may need to complete initialization operations before the data processing system launches the BIOS.

In one embodiment, a data processing system includes a central processing unit (CPU) that includes at least one processing core and an uncore. For purposes of this disclosure, a CPU may also be referred to as a "processor," and a processing core may also be referred to simply as a "core."

The processor uses the core to execute instructions from a BIOS, from an OS, and from applications. The uncore includes various components which support the core, such as microcontrollers and other circuitry to enable the core to communicate with components outside of the CPU. Before the data processing system launches the BIOS, the data processing system initializes at least some of the components in the data processing system, including the core and various components in the uncore. The components that are initialized before the data processing system launches the BIOS may be referred to as "pre-BIOS components." The data processing system may initialize the pre-BIOS components in response to a user pressing a power button on the data processing system, for example.

After the pre-BIOS components have been initialized, the uncore sends a CPU reset signal to the core. In response, the core then launches the BIOS. In particular, the core enters a working state in response to the CPU reset signal and begins executing instructions starting at a location known as the "reset vector." The instruction at the reset vector is the first instruction of the BIOS. The working state (in which the core is capable of executing instructions) may be referred to as an "S0" sleep state and as a "G0" global state in specifications such as Version 6.3 of the Advanced Configuration and Power Interface (ACPI) Specification (the "ACPI Specification") from January of 2019.

A conventional data processing system may be capable of tracking how much time is spent executing the BIOS before the OS is launched. But a conventional data processing system is not capable of tracking how much time is spent initializing pre-BIOS components. Consequently, a conventional data processing system is not able to determine total boot time.

BRIEF DESCRIPTION OF THE DRAWINGS

Features and advantages of the present invention will become apparent from the appended claims, the following detailed description of one or more example embodiments, and the corresponding figures, in which:

FIG. 3 is a table illustrating an example set of pre-BIOS component codes and corresponding descriptions.

FIG. 4 is a block diagram illustrating an example set of telemetry records with a table that provides descriptions for those telemetry records.

DETAILED DESCRIPTION

Figure 1:
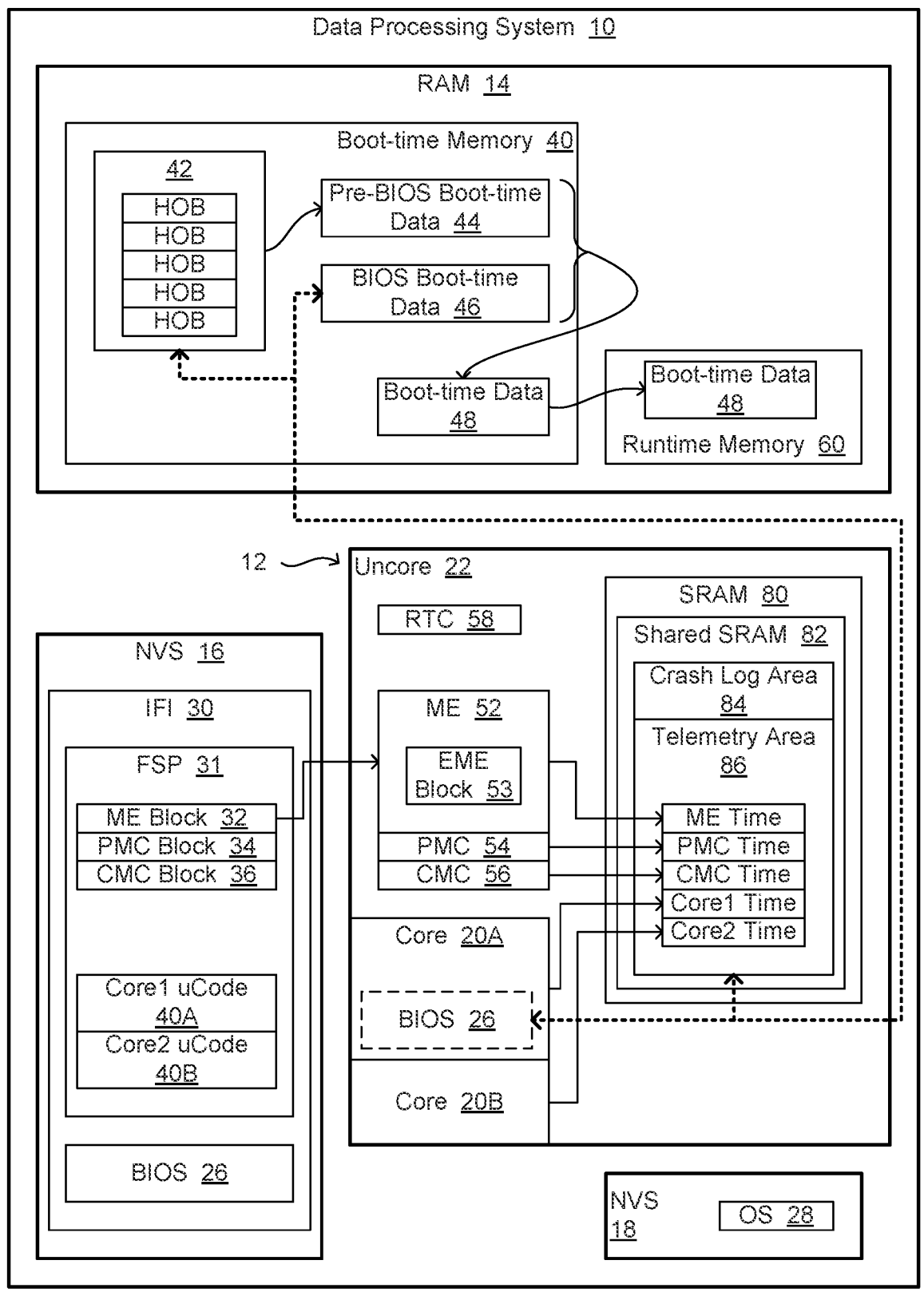
FIG. 1 is a block diagram of an example embodiment of a data processing system with technology to measure boot activity before a processor enters a working state.

As indicated above, a conventional data processing system may be capable of tracking BIOS boot time, but not pre-BIOS boot time. For instance, in one scenario, a conventional tablet my take 3 seconds to boot up from a power-off state, with half of that time spent initializing pre-BIOS components, and the other half spent by the BIOS initialization process. Consequently, when a person uses a system management tool on that tablet to determine how much time was spent booting, that tool may report a boot time of 1.5 seconds, when the tablet actually took 3 seconds to boot.

By contrast, a data processing system according to the present disclosure includes technology for measuring and reporting on the amount of time spent initializing pre-BIOS components. The paragraphs below provide additional details for one or more example embodiments of such a data processing system.

In one embodiment, a data processing system initializes its pre-BIOS components before sending a CPU reset signal to a CPU, and then the CPU launches a BIOS in response to the CPU reset signal. Consequently, the pre-BIOS components may also be referred to as "pre-reset components" or "pre-CPU components." Similarly, the initialization tasks that are performed by the pre-BIOS components may be referred to as "pre-BIOS boot tasks," "pre-reset boot tasks," or "pre-CPU boot tasks."

Also, for purposes of this disclosure, the term "boot time" denotes the amount of time that elapses while a device or component is performing an initialization process. Accordingly, the term "pre-BIOS boot time" denotes the amount of time that elapses while pre-BIOS components are initialized (before the BIOS is launched), and the term "BIOS boot time" denotes the amount of time that elapses while the BIOS prepares to launch the OS. In other words, the BIOS boot time indicates how much time is spent executing the BIOS before the OS is launched. Thus, the total boot time for a data processing system includes the pre-BIOS boot time and the BIOS boot time.

Also, after the BIOS software completes its boot tasks and launches the OS, a portion of the BIOS software may remain active to provide the OS with services known as "BIOS runtime services." For purposes of this disclosure, the term "BIOS" refers to the BIOS software that initializes the data processing system and launches the OS, rather than the BIOS runtime services.

In one embodiment, a data processing system includes a processor that contains at least one core and an uncore. Also, the pre-BIOS components in the data processing system include the core and components in the uncore, such as microcontrollers, etc. The data processing system completes pre-BIOS boot tasks to initialize the pre-BIOS components after a power button is pressed but before a CPU reset signal is sent to the core and the core enters a working state. Furthermore, the data processing system includes technology to enable the data processing system to track the pre-BIOS boot time of the pre-BIOS boot tasks.

The pre-BIOS boot tasks may be performed or controlled, at least in part, by low-level software such as microcode. That software, and any other software that runs before the OS is launched (e.g., the BIOS), may be referred to as "firmware." Furthermore, the firmware that runs before the BIOS is launched may be referred to as "pre-BIOS firmware." A data processing system according to the present disclosure may track pre-BIOS boot activity by measuring and reporting on how much time is spent executing pre-BIOS firmware.

The pre-BIOS components may perform the pre-BIOS tasks by executing the pre-BIOS firmware. In one embodiment, different portions of the pre-BIOS firmware are executed by different pre-BIOS components. Also, the different portions of the pre-BIOS firmware may be referred to as "pre-BIOS blocks."

FIG. 1 is a block diagram of an example embodiment of a data processing system 10 with technology to measure boot activity before a processor 12 in data processing system 10 enters a working state. In particular, data processing system 10 is a hypothetical embodiment that includes technology for tracking (i.e., measuring and reporting on) the amount of time that elapses between the time that data processing system 10 is powered on and the time that processor 12 enters a working state, such as the S0 state. In other words, data processing system 10 includes technology for tracking pre-BIOS boot time.

Data processing system 10 includes various hardware and software components. The hardware components include processor 12, random-access memory (RAM) 14, non-volatile storage (NVS) 16, and NVS 18. Processor 12 includes a first core 20A, a second core 20B, and an uncore 22. Core 20A may also be referred to as the "first core" or "core1," and core 20B may also be referred to as the "second core" or "core2." (However, in another embodiment, a first core may be referred to as "core0," a second core may be referred to as "core1," etc.) Uncore 22 includes a real-time clock (RTC) 58 which keeps track of the current time, even when data processing system 10 is turned off. Uncore 22 also includes various pre-BIOS components, including a management engine (ME) 52, a power management controller (PMC) 54, a core management controller (CMC) 56, and static RAM (SRAM) 80. As described in greater detail below, each pre-BIOS component uses RTC 58 to compute the boot time consumed by that component. The cores are also considered to be pre-BIOS components because they are initialized before the BIOS is launched.

In various embodiments an ME may be implemented as an Intel® Converged Security Engine (CSE), as an Intel® Converged Security and Management Engine (CSME), or as any other suitable type of platform management module. In various embodiments a CMC may be implemented as a processor unit (PUNIT) or as any other suitable type of core management module. Also, as described in greater detail below, different embodiments may include different pre-BIOS components (e.g., an authenticated code module (ACM)).

Data processing system 10 may also include other hardware components, such as a power button, a reset button, a power supply unit (PSU), one or more RTC rails, one or more power rails, one or more clock generators to generate one or more hardware clock signals to drive execution circuits and/or input/output (I/O) circuits, etc. However, for clarity and ease of understanding, such components are not illustrated in FIG. 1.

The software components in data processing system 10 include BIOS software 26 and an OS 28. BIOS software 26 may be referred to as "BIOS" 26 for short. BIOS 26 may be included as part of an integrated firmware image (IFI) 30, for instance. IFI 30 may also include a firmware support package (FSP) 31. FSP 31 includes various pre-BIOS blocks which are executed by pre-BIOS components in data processing system 10 when data processing system 10 is powered on. FSP 31 may be created and provided by a manufacturer of processor 12, and FSP 31 may be combined with BIOS 26 into IFI 30 by a manufacturer of data processing system 10, for instance.

In the embodiment of FIG. 1, the pre-BIOS blocks in FSP 31 include an ME block 32, a PMC block 34, and a CMC block 36. The pre-BIOS blocks also include microcode (uCode) patches to be applied the cores as part of the initialization process, before a CPU reset signal is sent to any core. In particular, the pre-BIOS blocks in FSP 31 include core1 uCode 40A (to be applied to core 20A) and core2 uCode 40B (to be applied to core 20B). The pre-BIOS blocks in data processing system 10 also include an embedded ME (EME) block 53 that ME 52 can access before hardware for communicating with NVS 16 has been initialized. EME block 53 may reside in read-only memory (ROM) in ME 52, for instance. However, different embodiments may include different pre-BIOS blocks (e.g., an ACM block).

Generally, a pre-BIOS block includes control logic that is executed by the corresponding pre-BIOS component, to initialize that component. However, a pre-BIOS block may also cause a pre-BIOS component to initialize another pre-BIOS component. For instance, a pre-BIOS block may include code (i.e., software) that (a) executes on one pre-BIOS component and (b) initializes another pre-BIOS component. For instance, ME 52 may execute EME block 53, and EME block 53 may cause ME 52 to initialize itself and to initialize SRAM 80.

In addition, each pre-BIOS block includes control logic for measuring the amount of time used by that block to initialize a pre-BIOS component, and for saving that measurement to SRAM 80, as described in greater detail below. In FIG. 1, such time measurements are illustrated in SRAM 80 as ME time, PMC time, etc. Thus, the pre-BIOS blocks enable the pre-BIOS components to track the boot time that elapses before processor 12 begins executing BIOS 26.

Figure 2A:
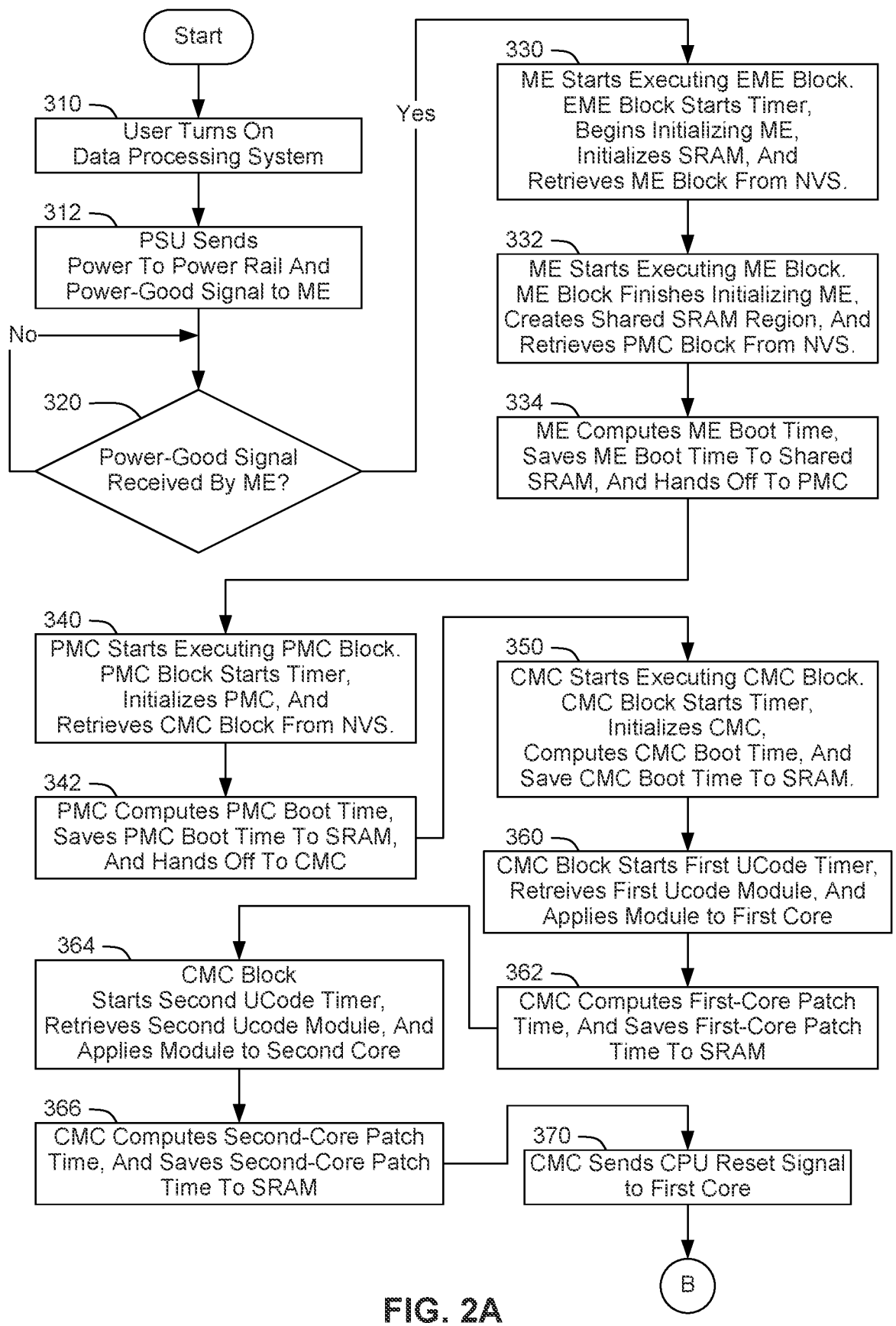
FIGS. 2A and 2B present a flowchart of an example embodiment of a process for measuring boot activity in a data processing system before a processor enters a working state.
Figure 2B:
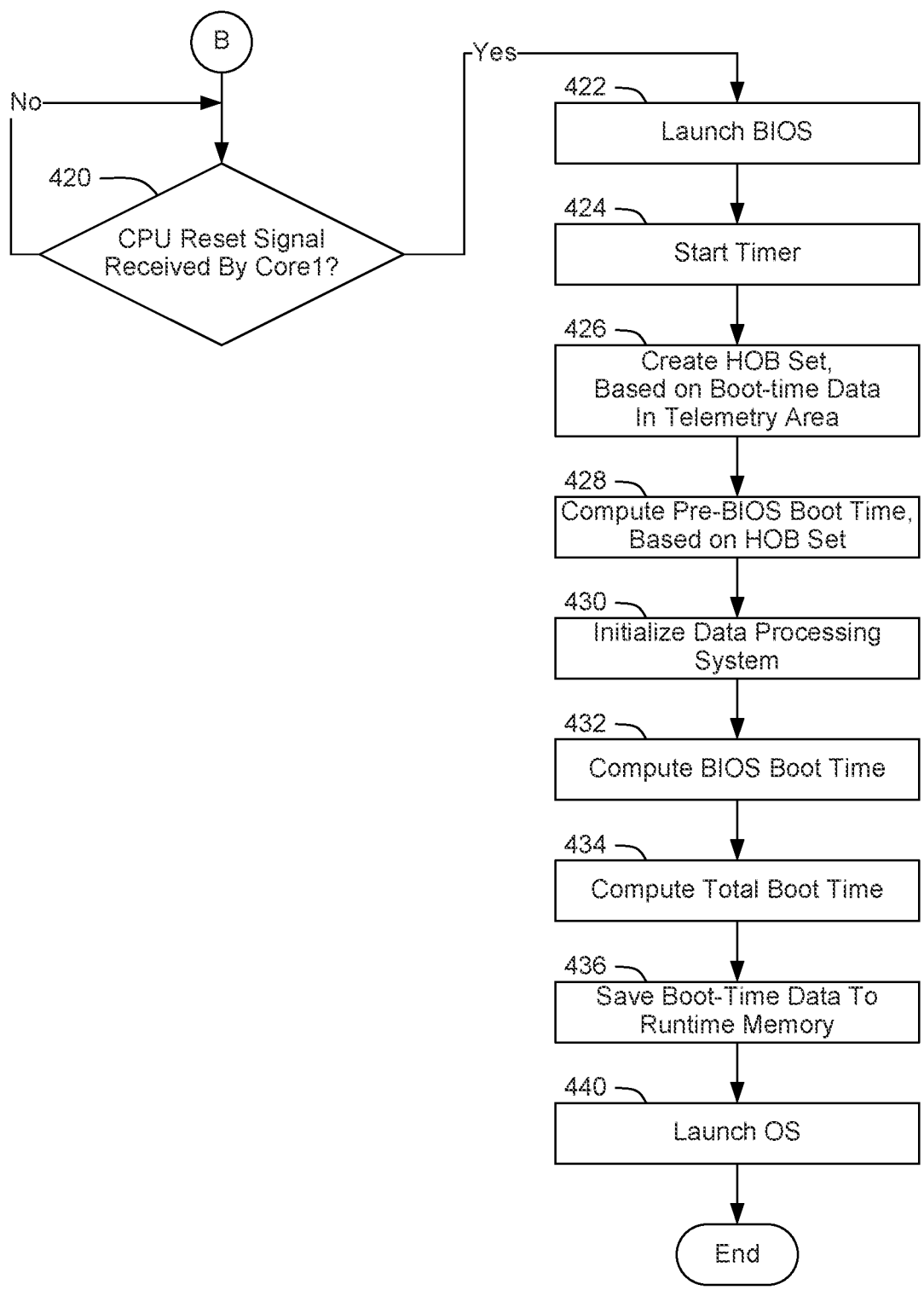

FIGS. 2A and 2B present a flowchart of an example embodiment of a process for measuring boot activity in data processing system 10. The process starts with data processing system 10 turned off (e.g., in the state referred to by the ACPI Specification as "mechanical off" or "G3"). As shown at block 310, a user then presses a power button to turn on data processing system 10. In response, the PSU of data processing system 10 sends power to one or more power rails and sends a power-good signal to ME 52 to indicate that the PSU is sending reliable power to the power rail(s), as shown at block 312. However, ME 52 may also wait for any clock generators to stabilize before sending the power-good signal to ME 52.

As shown at blocks 320 and 330, ME 52 responds to the power-good signal by starting to execute EME block 53. As shown at block 332, EME block 53 causes ME 52 to start a timer to track the boot time for ME 52 and to start initializing ME 52. ME 52 may start that timer by saving the current time indicated by RTC 58 as the ME start time. EME block 53 also causes ME 52 to initialize SRAM 80 and retrieve ME block 32 from NVS 16 into SRAM 80. As shown at block 332, ME 52 then starts executing ME block 32. ME block 32 then causes ME 52 to finish initializing itself, to create a region of shared SRAM 82 that will be also accessible to some or all of the other pre-BIOS components, and to retrieve PMC block 34 from NVS 16 to shared SRAM 82. The arrow in FIG. 1 between ME block 32 and ME 52 indicates that ME 52 executes ME block 32. However, as indicated above, ME block 32 may by copied to SRAM 80, and ME 52 may actually execute that copy from SRAM 80.

In one embodiment, ME block 32 causes ME 52 to configure shared SRAM 82 to include a crash log area 84 and a telemetry area 86, and to initialize telemetry area with null data (e.g., with the code 0xDEADBEEF). Also, as described in greater detail below, the pre-BIOS components are configured to save their boot-time data to telemetry area 86.

As shown at block 334, ME block 32 then causes ME 52 to compute the ME boot time and to save that boot-time measurement to telemetry area 86 in shared SRAM 82. For instance, ME 52 may measure the amount of time that elapsed during the initialization process for ME 52 by subtracting the ME start time from the current time indicated by RTC 58. For instance, as depicted in FIG. 1, ME 52 may save that measurement in telemetry area 86 as "ME time."

Telemetry area 86 may have any suitable size and structure. For instance, in one embodiment, ME 52 allocates telemetry area 86 as a 4 kilobyte (KB) area that is treated as an array of 1,000 32-bit entries or records. One of those 32-bit telemetry records 88 is used to save the boot-time measurement for each pre-BIOS component, as described in greater detail below. For instance, in one embodiment, each pre-BIOS block is programmed (a) to read from telemetry area 86, starting at the base, until a null record is found, and then (b) to write the time measurement to that record. Telemetry records with boot-time data for pre-BIOS components may also be referred to as "pre-BIOS boot-time records."

Referring again to FIG. 2A, as shown at block 334, after saving the ME boot time, ME 52 hands off or transfers control to PMC 54.

In response, as shown at block 340, PMC 54 starts executing PMC block 34 from SRAM 80. PMC block 34 then causes PMC 54 to save the start time, to initialize PMC 54, and to retrieve CMC block 36 from NVS 16. As shown at block 342, PMC block 34 then causes PMC 54 to compute the PMC boot time (e.g., by subtracting the start time from the current time) and to save that boot-time measurement to telemetry area 86. For instance, as depicted in FIG. 1, PMC 54 may save that measurement in telemetry area 86 as "PMC time."

As shown at block 342 of FIG. 2, PMC 54 then hands off or transfers control to CMC 56.

In response, as shown at block 350, CMC 56 starts executing CMC block 36 from SRAM 80. CMC block 36 then causes CMC 56 to save the start time, to initialize CMC 56, to compute the CMC boot time, and to save that boot-time measurement to telemetry area 86. For instance, as depicted in FIG. 1, CMC 56 may save that measurement in telemetry area 86 as "CMC time."

As shown at block 360, CMC block 36 then causes CMC 56 to start a first uCode timer, retrieve core1 uCode 40A from NVS 16, and initializes core 20A by applying that uCode to core 20A. As shown at block 362, CMC block 36 then causes CMC 56 to compute the amount of time that was used to initialize core 20A (e.g., by subtracting the start time from the current time) and to save that measurement to telemetry area 86. For instance, as depicted in FIG. 1, CMC 54 may save that measurement in telemetry area 86 as "Core1 time." As shown at block 364, CMC block 36 then causes CMC 56 to start a second uCode timer, retrieve core2 uCode 40B from NVS 16, and initialize core 20B by applying that uCode to it. As shown at block 366, CMC block 36 then causes CMC 56 to compute the amount of time that was used to initialize core 20B (e.g., by subtracting the start time from the current time) and to save that measurement to telemetry area 86. For instance, as depicted in FIG. 1, CMC 54 may save that measurement in telemetry area 86 as "Core2 time." In FIG. 1, the arrows leading to the telemetry records in telemetry area 86 indicate that each telemetry record pertains to a particular pre-BIOS component.

In the present embodiment (i.e., the embodiment of FIG. 1), all pre-BIOS components will then have been initialized. Consequently, a component in uncore 22 sends a CPU reset signal to core 20A, thereby ending the pre-BIOS boot phase and starting the BIOS boot phase. In particular, in the present embodiment, CMC 36 sends a CPU reset signal to core 20A after initializing all of the cores, as shown at block 370. The process then passes through page connector B to FIG. 2B. As described in greater detail below, when core 20A receive the CPU reset signal, it responds by entering a working state and launching BIOS 26, which then performs additional initialization operations before launching OS 28. In addition, as described in greater detail below, BIOS 26 measures the BIOS boot time, and BIOS 26 makes the BIOS boot-time data and the pre-BIOS boot-time data available to OS 28.

In the hypothetical embodiment of FIG. 1, the pre-BIOS components in data processing system 10 include ME 52, PMC 54, CMC 56, core 20A, and core 20B. However, other embodiments may include different pre-BIOS components, including fewer or more pre-BIOS components. Other embodiment may also include different pre-BIOS blocks for initializing those pre-BIOS components, including fewer or more pre-BIOS blocks. In addition, other embodiments may include similar pre-BIOS components, but those components may distribute the initialization tasks differently, and they may measure and report their respective boot times differently. For instance, a pre-BIOS component may perform multiple boot stages, and that component may report the boot time for each of those stages separately. For example, an ME may perform multiple different initialization stages, interspersed with one or more stages performed by other components, such as a PMC. Accordingly, the ME may compute and save a different boot time for each of its stages (e.g., an ME1 time, an ME2 time, etc.).

In one alternative embodiment, a data processing system includes a processor with at least one core and an uncore, and the processor performs a boot process that involves pre-BIOS boot tasks and pre-BIOS components such as the following:

(A) a first CSE initialization task, in which a CSE executes instructions from ROM within the CSE. For instance, the CSE may be a type of ME, and the instructions may cause the CSE to initialize itself and to initialize SRAM in the processor. The instructions may also include a ROM Boot Extension (RBE), and instructions may cause the CSE to load to the RBE to SRAM. The CSE may then execute the RBE. The RBE may cause the CSE to load a PMC firmware block to the SRAM from an FSP;

(B) a first PMC initialization task to initialize a PMC and load a patch on the PMC from a PMC block in an FSP;

(C) a second CSE initialization task, in which the RBE that the CSE is executing passes control (within the CSE) to a CSE block of instructions from the FSP (that CSE block may be referred to as a "CSE OS," for example);

(D) a second PMC initialization task, in which the PMC executes a PMC block from the FSP, which causes the PMC to retrieve uCode from the FSP, and to configure the core(s) for boot by initialize the core(s) and loading the uCode into the core(s); and (E) an ACM task, in which an ACM in the data processing system executes an ACM block from the FSP, which causes the ACM to authenticate a BIOS image in NVS of the data processing system.

Referring again to FIG. 2B, in the present embodiment, after data processing system 10 is powered on, core 20A waits for a CPU reset signal, as shown at block 420. When core 20A receive the CPU reset signal, it launches BIOS 26, as shown at block 422 (and as suggested by the "BIOS 26" box with dashed lines in core 20A). As shown at block 424, BIOS 26 may then start a timer to measure the BIOS boot time (e.g., by saving the current time from RTC 58). As shown at block 425, BIOS 26 may then initialize RAM 14 and allocate a region of RAM 14 to be used as boot-time memory 40. As shown at block 426, BIOS 26 may then retrieve the pre-BIOS boot-time data from telemetry area 86 and save it to boot-time memory 40. In particular, in one embodiment, BIOS 26 creates a set of hand-off blocks (HOBs) 42, with each HOB containing the boot-time data from one of the non-null records in telemetry area 86, as indicated in FIG. 1 by the dashed line connecting BIOS 26 (in core 20A) with telemetry area 86 and with the set of HOBs 42 in boot-time memory 40.

As indicated above, in the embodiment of FIG. 1, telemetry area 86 is a 4 KB area that is treated as an array of telemetry records 88, each of which occupies 32 bits, with each pre-BIOS component using one telemetry record to save its boot-time measurement. In one embodiment, each telemetry record includes (a) a component field of 1 byte to include a component code and (b) a time field (or payload) of 3 bytes to include a boot-time measurement. However, other embodiments may use records with different sizes and formats.

FIG. 3 is a table illustrating an example set of pre-BIOS component codes and corresponding descriptions. In the present embodiment, each pre-BIOS block is preconfigured with a predetermined component code to identify the type of component that is to be initialized by that pre-BIOS block. And when a pre-BIOS block stores a telemetry record, the pre-BIOS block includes (a) the measured boot time in the time field of that record and (b) the corresponding component code in the component field. For instance, as illustrated in FIG. 3, component codes 0x01 through 0x08 denote respective cores, and codes 0x09 through 0x0C denote an ME, a PMC, a CMC, and an ACM, respectively. However, other codes may be used in other embodiments. For instance, codes 0x00 through 0x07 may be user for up to 8 respective cores, or codes 0x00 through 0x0F may be used for up to 16 respective cores, etc.

FIG. 4 is a block diagram illustrating an example set of telemetry records 88, with a table that provides descriptions for those telemetry records. For instance, data processing system 10 may generate such records using the process described above. Also, for purposes of illustration, the time field denotes time in microseconds (s), but other embodiments may record the time data using other units. In particular, telemetry records 88 indicate that, in one hypothetical scenario, the ME boot time was 15,000 s, the PMC boot time was 8,000 s, the CMC boot time was 10,000 s, the core1 boot time was 5,000 s, and the core2 boot time was 5,000 s. All other entries include data to indicate that those entries are null or unused. For instance, as indicated above, the code 0xDEADBEEF may denote a null record.

Referring again to FIG. 2B, as indicated above with regard to block 426, BIOS 26 retrieves telemetry records 88 from telemetry area 86 and saves that pre-BIOS boot-time data to boot-time memory 40 as a set of HOBs 42. Also, as shown at block 428, BIOS 26 adds all of the pre-BIOS boot-time data to compute the aggregate or cumulative pre-BIOS boot time. BIOS 26 may then save the original data and the cumulative total as pre-BIOS boot-time data 44, as reflected in FIG. 1 by the arrow from HOB set 42 to pre-BIOS boot-time data 44.

As shown at block 430 of FIG. 4, BIOS 26 then completes the initialization of data processing system 10. That process may include configuring a portion of RAM 14 as runtime memory 60, which will be available to OS 28 once OS 28 has been launched. That process may also include measuring and logging time data for various steps within the BIOS initialization process.

As shown at block 432, BIOS 26 then computes the total BIOS boot time (e.g., by subtracting the start time from the current time from RTC 58). BIOS 26 may also save the logged time data and the (total) BIOS boot time to boot-time memory (e.g., as BIOS boot-time data 46), as indicated by the dashed arrow connecting BIOS 26 in core 20A with BIOS boot-time data 46. As shown at block 434, BIOS 26 then adds the pre-BIOS boot time and the BIOS boot time to compute the total boot time. BIOS 26 may then save some or all of the boot time measurements to boot-time memory 40 as boot-time data 48, as reflected in FIG. 1 by the arrow from pre-BIOS boot-time data 44 and BIOS boot-time data 46 to boot-time data 48. As shown at block 436 of FIG. 4, BIOS 26 also saves boot-time data 48 to runtime memory 60.

In one embodiment, boot-time data 48 indicates (a) the total pre-BIOS boot time, (b) the total BIOS boot time, and (c) the total boot time. In addition, boot-time 48 may indicate (a) the respective boot times for the pre-BIOS components and (b) the respective boot times for various stages of the BIOS boot process. Accordingly, boot-time data 48 may also be referred to as "aggregate boot-time data." For instance, in the scenario involving boot times such as those illustrated in FIG. 4, boot-time data 48 may indicate a total pre-BIOS boot time of 1.8 seconds. Boot-time data 48 may also indicate a BIOS boot time of 0.9 seconds, for example, and a total boot time of 2.7 seconds.

As shown at block 440, BIOS 26 then launches OS 28. OS 28 may then access boot-time data 48, and that data may be used for a wide variety of purposes. For instance, a firmware developer may use boot-time data 48 to determine whether modifications to the firmware in data processing system 10 cause longer or shorter pre-BIOS boot times. Also, the boot-time data from different data processing systems may be compared and used to guide software and/or hardware development efforts, for marketing purposes, etc.

As indicated above, the pre-BIOS components are initialized using pre-BIOS blocks which cause the pre-BIOS components to track the elapsed time for initializing each pre-BIOS component and to save those time measurements to a telemetry area in shared SRAM. In one embodiment, each pre-BIOS block is preconfigured with predetermined values indicating the base address for the telemetry area and the limit for the telemetry area. Similarly, the BIOS is also preconfigured with those values, to enable the BIOS to extract the telemetry records from the telemetry area.

Also, in one embodiment, each pre-BIOS component that executes a pre-BIOS block includes a port to enable that component to write to the telemetry area, and a port to enable that component to read the RTC. Such ports may be referred to as a "telemetry port" and an "RTC port," respectively. Also, the uncore may include one or more communication channels to connect each telemetry port to SRAM 80 and to connect each RTC port to the RTC. Such a channel(s) may be a sideband channel, a secondary hardware fabric, or any other suitable communication channel.

Also, in one embodiment, the BIOS may be configured to query the processor to determine whether or not the processor is capable of reporting pre-BIOS boot-time data. Likewise, the processor may be configured to provide a capability identifier to the BIOS to indicate whether or not the processor is capable of reporting pre-BIOS boot-time data.

Also, the uncore is configured to allow the core that is running the BIOS to access the telemetry area in the shared SRAM. In addition, in one embodiment, for security purposes, after the BIOS has extracted the telemetry records and before the BIOS boots the OS, the BIOS clears the telemetry area. Alternatively, before launching the OS, the BIOS may lock some or all of the SRAM to make the SRAM inaccessible until the next platform reset.

Although the present disclosure focuses on more or more example embodiments, the present teachings may be used in many different kinds of data processing systems. In one embodiment, the BIOS in a data processing system follows Version 2.8 of the Unified Extensible Firmware Interface (UEFI) Specification, dated June 2020 (the "UEFI Specification"), and the BIOS makes runtime memory which contains the boot-time data available to the OS via one or more UEFI variables. Consequently, the OS may access those variables via BIOS runtime services. Accordingly, the memory containing the boot-time data may be referred to as "runtime services memory." However, in other embodiments, a data processing system use any other suitable type of BIOS. Such BIOSs may be based on BIOS packages referred to by names or trademarks such as Coreboot, Slim Bootloader (SBL), etc.

Also, the embodiment of FIG. 1 does not include an ACM block to validate the BIOS. However, other embodiments may include an ACM block. Also, in some embodiments, a data processing system may execute an ACM block as part of the pre-BIOS initialization process, and the time consumed by the ACM block may be attributed to the pre-BIOS boot time. In another embodiment, a data processing system may execute an ACM block after sending a CPU reset signal to a core, and the time consumed by the ACM block may be attributed to the BIOS boot time. And, as indicated above, different embodiments may include different pre-BIOS components and different pre-BIOS blocks for initializing those components.

In addition, the description above discusses the pressing of a power button as the trigger for a data processing system to boot. However, the present teachings may also be used to measure boot time for boot processes with other triggers. Such trigger events include without limitation the pressing of a reset button on the data processing system, the selection of a "restart" option from an OS, and the receipt of a reset command from a remote system by an embedded system-management controller. Also, some events may cause the boot process to start from a state other than mechanical off. For instance, in response to an OS restart command, a data processing system my start the boot process from the state referred to by the ACPI specification as "soft-off," "G2," or "S5." Consequently, the data processing system may measure the boot time as including the time from the G2 state to the S0 state (or working state), and the time from the S0 state (or working state) to the start/boot of the OS.

Also, the description above refers to operations for computing the "total boot time" by adding the measured pre-BIOS boot time to the measured BIOS boot time. However, when starting from mechanical off, a data processing system may consume a small amount of time in an electrical stabilization phase before the first pre-BIOS component begins executing the first pre-BIOS block. During that phase the data processing system may wait for completion of tasks such as (a) clock stabilization, to allow at least one rail for an RTC to become stable and (b) power stabilization, to allow power to the processor to become stable (e.g., to allow power to ramp in a deep Sx well (DSW) in the uncore). Accordingly, the boot times reported by the BIOS may not include the amount of time consumed by the electrical stabilization phase. However, the time consumed by the electrical stabilization phase will typically be less than ten percent of the total pre-BIOS boot time.

In addition, other techniques may be used to measure the time consumed by the electrical stabilization phase. And one or more of those techniques may be combined with the teachings described above to measure and report a boot time measurement that is more comprehensive. For instance, to measure the time consumed by the electrical stabilization phase, a tool may be used to measure the elapsed time for rebooting from soft-off (e.g., in response to a restart command). That time measure may be referred to as "X," and it may be measured, for instance, by a management console, after the data processing system has been connected as a device under test (DUT) to that management console. If the elapsed time for booting from mechanical off is referred to as "Y," subtracting X from Y would leave a result "Z" that indicates the extra time needed to boot from mechanical off. In particular, "Z" would indicate the time consumed by the electrical stabilization phase. Consequently, a person or a software tool could then add Z to Y to compute a more comprehensive indication of the total time to boot from mechanical off.

For purposes of this disclosure, the term "total boot time" denotes the time from the start of execution of the first pre-BIOS block to the start of the OS. By contrast, the term "comprehensive boot time" denotes the time from the event that triggered the boot process to the start of the OS. And similarly, the term "total pre-BIOS boot time" denotes the time from the start of execution of the first pre-BIOS block to the processor entering a working state, while the term "comprehensive pre-BIOS boot time" denotes the time from the event that triggered the boot process to the start of the BIOS.

As has been described, a data processing system according to the present disclosure includes technology for measuring boot activity before a processor in the data processing system enters a working state.

CONCLUSION

In light of the principles and example embodiments described in the present disclosure by text and/or illustration, one with skill in the art will recognize that the described embodiments can be modified in arrangement and detail without departing from the principles described herein. In the present disclosure, expressions such as "one embodiment" and "another embodiment" are meant to generally reference embodiment possibilities. Those expressions are not intended to limit the invention to particular embodiment configurations. For instance, those expressions may reference the same embodiment or different embodiments, and those different embodiments are combinable into other embodiments.

Additionally, the present teachings may be used to advantage in many different kinds of data processing systems. Such data processing systems may include, without limitation, mainframe computers, mini-computers, supercomputers, high-performance computing systems, computing clusters, distributed computing systems, personal computers (PCs), workstations, servers, client-server systems, portable computers, laptop computers, tablet computers, entertainment devices, audio devices, video devices, audio/video devices (e.g., televisions and set-top boxes), handheld devices, smartphones, telephones, personal digital assistants (PDAs), wearable devices, vehicular processing systems, accelerators, systems on a chip (SoCs), and other devices for processing and/or transmitting information. Accordingly, unless explicitly specified otherwise or required by the context, references to any particular type of data processing system (e.g., a PC) should be understood as encompassing other types of data processing systems, as well. A data processing system may also be referred to as an "apparatus." The components of a data processing system may also be referred to as "apparatus."

Also, according to the present disclosure, a device may include instructions and other data which, when accessed by a processor, cause the device to perform particular operations. For purposes of this disclosure, instructions or other data which cause a device to perform operations may be referred to in general as "software" or "control logic". Software that is used during a boot process may be referred to as "firmware." Software that is stored in non-volatile memory may also be referred to as "firmware." Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Also, any suitable operating environment and programming language (or combination of operating environments and programming languages) may be used to implement software components described herein. For example, program code may be implemented in a compiled language, in an interpreted language, in a procedural language, in an object-oriented language, in assembly language, in machine language, or in any other suitable language.

A medium which contains data and which allows another component to obtain that data may be referred to as a "machine-accessible medium" or a "machine-readable medium." Accordingly, embodiments may include machine-readable media containing instructions for performing some or all of the operations described herein. Such media may be referred to in general as "apparatus" and in particular as "program products." In one embodiment, software for multiple components may be stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely.

Similarly, operations that are described as being performed on one particular device in one embodiment may, in other embodiments, be performed by one or more other devices. Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

The machine-readable media for some embodiments may include, without limitation, tangible non-transitory storage components such as magnetic disks, optical disks, magneto-optical disks, dynamic random-access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. For instance, in some embodiments, some or all of the control logic for implementing the described functionality may be implemented in hardware logic circuitry, such as with an application-specific integrated circuit (ASIC) or with a programmable gate array (PGA). Similarly, some or all of the control logic may be implemented as microcode in an integrated circuit chip. Also, terms such as "circuit" and "circuitry" may be used interchangeably herein. Those terms and terms like "logic" may be used to refer to analog circuitry, digital circuitry, processor circuitry, microcontroller circuitry, hardware logic circuitry, hard-wired circuitry, programmable circuitry, state machine circuitry, any other type of hardware component, or any suitable combination of hardware components.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as "signals." Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer-readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine-readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

Embodiments include the following examples:

Example A1 is a data processing system comprising a processing core to execute a BIOS as part of a boot process and SRAM in communication with the processing core. The data processing system also comprises a pre-BIOS component in communication with the SRAM. The pre-BIOS component is configured to execute pre-BIOS firmware before the processing core begins executing the BIOS. The pre-BIOS firmware, when executed by the pre-BIOS component, causes the pre-BIOS component to (a) initialize the pre-BIOS component, (b) measure an amount of time taken to initialize the pre-BIOS component, and (c) save the measured amount of time to the SRAM as a pre-BIOS boot-time record.

Example A2 is a data processing system according to Example A1, further comprising RAM in communication with the processing core, NVS in communication with the pre-BIOS component and the processing core, and a BIOS in the NVS. The BIOS, when executed by the processing core, causes the processing core to (a) retrieve the pre-BIOS boot-time record from the SRAM and (b) save the pre-BIOS boot time to the RAM.

Example A3 is a data processing system according to Example A1, further comprising RAM in communication with the processing core, NVS in communication with the pre-BIOS component and the processing core, and a BIOS in the NVS. The BIOS, when executed by the processing core, causes the processing core to (a) measure a BIOS boot time that indicates an amount of time taken to execute the BIOS during the boot process; (b) retrieve the pre-BIOS boot-time record from the SRAM; (c) compute total pre-BIOS boot time, based on the pre-BIOS boot-time record; and (d) save boot-time data to the RAM, wherein the boot-time data indicates (i) the total pre-BIOS boot time and (ii) the BIOS boot time. Example A3 may also include the features of Example A2.

Example A4 is a data processing system according to Example A3, comprising multiple pre-BIOS components to generate multiple pre-BIOS boot-time records and to save the multiple pre-BIOS boot-time records to the SRAM. Also, the BIOS, when executed by the processing core, causes the processing core to (a) retrieve the multiple pre-BIOS boot-time records from the SRAM and (b) compute the total pre-BIOS boot time, based on the multiple pre-BIOS boot-time records.

Example A5 is a data processing system according to Example A3, wherein the NVS comprises a firmware image, and the firmware image comprises the BIOS and at least some of the pre-BIOS firmware. Example A5 may also include the features of Example A4.

Example A6 is a data processing system according to Example A3, wherein the BIOS, when executed by the processing core, causes the processing core to save the boot-time data to runtime memory in the RAM. Example A6 may also include the features of any one or more of Examples A4-A5.

Example A7 is a data processing system according to Example A6, wherein the NVS comprises a first NVS, and the data processing system further comprises a second NVS comprising an OS. Also, the BIOS, when executed by the processing core, causes the processing core to launch the OS after completing a BIOS boot phase. The boot-time data in the runtime memory is to be accessible to the OS after the BIOS has launched the OS.

Example A8 is a data processing system according to Example A1, further comprising NVS in communication with the processing core, and a BIOS in the NVS. Also, the pre-BIOS firmware, when executed by the pre-BIOS component, causes the pre-BIOS component to send a CPU reset signal to the processing core. Also, the processing core is configured to start executing the BIOS in response to the CPU reset signal. Example A8 may also include the features of any one or more of Examples A2-A7.

Example A9 is a data processing system according to Example A1, wherein the pre-BIOS component is to initialize the SRAM before saving the pre-BIOS boot-time record to the SRAM. Example A9 may also include the features of any one or more of Examples A2-A8.

Example B1 is a processor comprising (a) a processing core to execute a BIOS as part of a boot process, (b) SRAM, and (c) a pre-BIOS component in communication with the SRAM. The pre-BIOS component is configured to execute pre-BIOS firmware before the processing core begins executing the BIOS. Also, the pre-BIOS firmware, when executed by the pre-BIOS component, causes the pre-BIOS component to (a) initialize the pre-BIOS component, (b) measure an amount of time taken to initialize the pre-BIOS component, and (c) save the measured amount of time to the SRAM as a pre-BIOS boot-time record.

Example B2 is a processor according to Example B1, wherein the pre-BIOS component comprises a management engine, the management engine comprises ROM, the ROM comprises an embedded pre-BIOS block, and the pre-BIOS firmware comprises the embedded pre-BIOS block.

Example B3 is a data processing system comprising (a) a processor according to Example B1, (b) NVS in communication with the pre-BIOS component, and (c) a pre-BIOS block in the NVS. Also, the pre-BIOS firmware comprises the embedded pre-BIOS block and the pre-BIOS block from the NVS. Example B3 may also include the features of Example B2.

Example B4 is a data processing system according to Example B3, further comprising RAM in communication with the processing core. Also, the NVS comprises the BIOS, and the BIOS, when executed by the processing core as part of the boot process, causes the processing core to (a) measure a BIOS boot time that indicates an amount of time taken to execute the BIOS during the boot process, (b) retrieve the pre-BIOS boot-time record from the SRAM, (c) compute total pre-BIOS boot time, based on the pre-BIOS boot-time record, and (d) save boot-time data to the RAM, wherein the boot-time data indicates (i) the total pre-BIOS boot time and (ii) the BIOS boot time.

Example B5 is a data processing system according to Example B4, wherein the BIOS, when executed by the processing core, causes the processing core to save the boot-time data to runtime memory in the RAM.

Example B6 is a data processing system according to Example B4, wherein the BIOS, when executed by the processing core, causes the processing core to (a) configure a portion of the RAM as runtime memory to be accessible to an OS and (b) save the boot-time data to the runtime memory. Example B6 may also include the features of Example B5.

Example C1 is an apparatus with technology for measuring boot activity before a processor enters a working state. The apparatus comprises a non-transitory machine-accessible medium and instructions in the machine-accessible medium which, when executed by a data processing system, enable the data processing system to (a) measure a BIOS boot time, based on an amount of time taken to complete a BIOS boot phase in a boot process of the data processing system; (b) retrieve a pre-BIOS boot-time record from SRAM in the data processing system; (c) compute total pre-BIOS boot time, based on the pre-BIOS boot-time record; and (d) save boot-time data to random-access memory (RAM) in the data processing system. The boot-time data indicates (a) the total pre-BIOS boot time and (b) the BIOS boot time.

Example C2 is an apparatus according to Example C1, wherein the operation of retrieving the pre-BIOS boot-time record from the SRAM comprises retrieving multiple pre-BIOS boot-time records for multiple pre-BIOS components from the SRAM.

Example C3 is an apparatus according to Example C1, wherein the instructions, when executed, configure a portion of the RAM as runtime memory to be accessible to an operating system OS. Also, the operation of saving boot-time data to RAM comprises saving the boot-time data to the runtime memory. Example C3 may also include the features of Example C2.

Example C4 is an apparatus according to Example C3, wherein the instructions, when executed, launch the OS after completing a BIOS boot phase and saving the boot-time data to the runtime memory.

Example C5 is an apparatus according to Example C4, wherein the OS, when executed, provides access to the boot-time data.

In view of the wide variety of useful permutations that may be readily derived from the example embodiments described herein, this detailed description is intended to be illustrative only, and should not be construed as limiting the scope of coverage.

What is claimed is:

1. A data processing system comprising:
   a processing core to execute a basic input/output system (BIOS) as part of a boot process;
   static random-access memory (SRAM) in communication with the processing core; and
   a pre-BIOS component in communication with the SRAM, wherein the pre-BIOS component is configured to execute pre-BIOS firmware before the processing core begins executing the BIOS, and wherein the pre-BIOS firmware, when executed by the pre-BIOS component, causes the pre-BIOS component to:
   initialize the pre-BIOS component;
   measure an amount of time taken to initialize the pre-BIOS component; and
   save the measured amount of time to the SRAM as a pre-BIOS boot-time record.

2. A data processing system according to claim 1, further comprising:
   random-access memory (RAM) in communication with the processing core;
   non-volatile storage (NVS) in communication with the pre-BIOS component and the processing core; and
   a BIOS in the NVS, wherein the BIOS, when executed by the processing core, causes the processing core to:
   retrieve the pre-BIOS boot-time record from the SRAM; and
   save the pre-BIOS boot time to the RAM.

3. A data processing system according to claim 1, further comprising:
   random-access memory (RAM) in communication with the processing core;
   non-volatile storage (NVS) in communication with the pre-BIOS component and the processing core; and
   a BIOS in the NVS, wherein the BIOS, when executed by the processing core, causes the processing core to:
   measure a BIOS boot time that indicates an amount of time taken to execute the BIOS during the boot process;

retrieve the pre-BIOS boot-time record from the SRAM; compute total pre-BIOS boot time, based on the pre-BIOS boot-time record; and save boot-time data to the RAM, wherein the boot-time data indicates the total pre-BIOS boot time and the BIOS boot time.

4. A data processing system according to claim 3, comprising:

multiple pre-BIOS components to generate multiple pre-BIOS boot-time records and to save the multiple pre-BIOS boot-time records to the SRAM; and wherein the BIOS, when executed by the processing core, causes the processing core to:

retrieve the multiple pre-BIOS boot-time records from the SRAM; and compute the total pre-BIOS boot time, based on the multiple pre-BIOS boot-time records.

5. A data processing system according to claim 3, wherein:

the NVS comprises a firmware image; and the firmware image comprises the BIOS and the pre-BIOS firmware.

6. A data processing system according to claim 3, wherein the BIOS, when executed by the processing core, causes the processing core to save the boot-time data to runtime memory in the RAM.

7. A data processing system according to claim 6, wherein:

the NVS comprises a first NVS; and the data processing system further comprises a second NVS comprising an operating system (OS); and wherein the BIOS, when executed by the processing core, causes the processing core to launch the OS after completing a BIOS boot phase; and wherein the boot-time data in the runtime memory is to be accessible to the OS after the BIOS has launched the OS.

8. A data processing system according to claim 1, further comprising:

non-volatile storage (NVS) in communication with the processing core; and a BIOS in the NVS; and wherein the pre-BIOS firmware, when executed by the pre-BIOS component, causes the pre-BIOS component to send a central processing unit (CPU) reset signal to the processing core; and wherein the processing core is configured to start executing the BIOS in response to the CPU reset signal.

9. A data processing system according to claim 1, wherein the pre-BIOS component is to initialize the SRAM before saving the pre-BIOS boot-time record to the SRAM.

10. A processor comprising:

a processing core to execute a basic input/output system (BIOS) as part of a boot process;

static random-access memory (SRAM); and a pre-BIOS component in communication with the SRAM;

wherein the pre-BIOS component is configured to execute pre-BIOS firmware before the processing core begins executing the BIOS; and wherein the pre-BIOS firmware, when executed by the pre-BIOS component, causes the pre-BIOS component to:

initialize the pre-BIOS component;

measure an amount of time taken to initialize the pre-BIOS component; and save the measured amount of time to the SRAM as a pre-BIOS boot-time record.

11. A processor according to claim 10, wherein:

the pre-BIOS component comprises a management engine;

the management engine comprises read-only memory (ROM);

the ROM comprises an embedded pre-BIOS block; and the pre-BIOS firmware comprises the embedded pre-BIOS block.

12. A data processing system comprising:

a processor according to claim 11;

non-volatile storage (NVS) in communication with the pre-BIOS component; and a pre-BIOS block in the NVS; and wherein the pre-BIOS firmware comprises the embedded pre-BIOS block and the pre-BIOS block from the NVS.

13. A data processing system according to claim 12, further comprising:

random-access memory (RAM) in communication with the processing core;

wherein the NVS comprises the BIOS; and wherein the BIOS, when executed by the processing core as part of the boot process, causes the processing core to:

measure a BIOS boot time that indicates an amount of time taken to execute the BIOS during the boot process;

retrieve the pre-BIOS boot-time record from the SRAM;

compute total pre-BIOS boot time, based on the pre-BIOS boot-time record; and save boot-time data to the RAM, wherein the boot-time data indicates the total pre-BIOS boot time and the BIOS boot time.

14. A data processing system according to claim 13, wherein the BIOS, when executed by the processing core, causes the processing core to save the boot-time data to runtime memory in the RAM.

15. A data processing system according to claim 13, wherein the BIOS, when executed by the processing core, causes the processing core to:

configure a portion of the RAM as runtime memory to be accessible to an operating system (OS); and save the boot-time data to the runtime memory.

16. An apparatus with technology for measuring boot activity before a processor enters a working state, the apparatus comprising:

a non-transitory machine-accessible medium; and instructions in the machine-accessible medium which, when executed by a data processing system, enable the data processing system to:

measure a basic input/output system (BIOS) boot time, based on an amount of time taken to complete a BIOS boot phase in a boot process of the data processing system;

retrieve a pre-BIOS boot-time record from static random-access memory (SRAM) in the data processing system;

compute total pre-BIOS boot time, based on the pre-BIOS boot-time record; and save boot-time data to random-access memory (RAM) in the data processing system, wherein the boot-time data indicates the total pre-BIOS boot time and the BIOS boot time.

17. An apparatus according to claim 16, wherein the operation of retrieving the pre-BIOS boot-time record from the SRAM comprises retrieving multiple pre-BIOS boot-time records for multiple pre-BIOS components from the SRAM.

18. An apparatus according to claim 16, wherein:
the instructions, when executed, configure a portion of the RAM as runtime memory to be accessible to an operating system (OS); and
the operation of saving boot-time data to RAM comprises saving the boot-time data to the runtime memory.

19. A non-transitory machine-accessible medium according to claim 18, wherein:
the instructions, when executed, launch the OS after completing a BIOS boot phase and saving the boot-time data to the runtime memory.

20. A non-transitory machine-accessible medium according to claim 19, wherein the OS, when executed, provides access to the boot-time data.

* * * * *